United States Patent [19]

Perkins

[11] Patent Number: 5,463,164
[45] Date of Patent: Oct. 31, 1995

[54] WASTE DISPOSAL IN SUBTERRANEAN EARTH FORMATIONS

[75] Inventor: Thomas K. Perkins, Dallas, Tex.

[73] Assignee: Atlantic Richfield Company, Los Angeles, Calif.

[21] Appl. No.: 216,002

[22] Filed: Mar. 22, 1994

[51] Int. Cl.⁶ ............................. B09B 3/00; A62D 3/00
[52] U.S. Cl. .................... 588/250; 175/66; 166/305.1; 405/128
[58] Field of Search ....................... 405/128, 129, 405/266, 53, 58; 588/250, 259, 249; 175/66, 206; 166/305.1, 308

[56] References Cited

U.S. PATENT DOCUMENTS

| | | | |
|---|---|---|---|
| 4,560,503 | 12/1985 | Bradley | 588/250 |
| 4,942,929 | 7/1990 | Malachasky et al. | 175/66 |
| 5,109,933 | 5/1992 | Jackson | 405/128 X |
| 5,213,446 | 5/1993 | Dovan | 405/128 |
| 5,226,749 | 7/1993 | Perkins | 405/266 |
| 5,314,265 | 5/1994 | Perkins et al. | 588/250 X |
| 5,338,493 | 8/1994 | Welch | 405/128 X |

*Primary Examiner*—Dennis L. Taylor
*Attorney, Agent, or Firm*—Michael E. Martin

[57] ABSTRACT

Predetermined quantities of slurried solids wastes are injected into earth formation waste disposal zones having a predetermined in situ stress distribution and compaction rate for a predetermined hydraulic injection pressure and wherein the disposal zones are bounded by zones having greater in situ stresses. Unconsolidated or lightly cemented formation zones may be used for waste disposal wherein it is determined that a substantial compaction of the material defining opposed faces of hydraulic fractures may occur. Fracture volume available for retention of solids in the slurry is calculated based on fracture height, fracture length, elastic deflection of the fracture faces, compaction of the fracture faces and the number of fractures based on either unequal or substantially equal horizontal stress distributions.

14 Claims, 1 Drawing Sheet

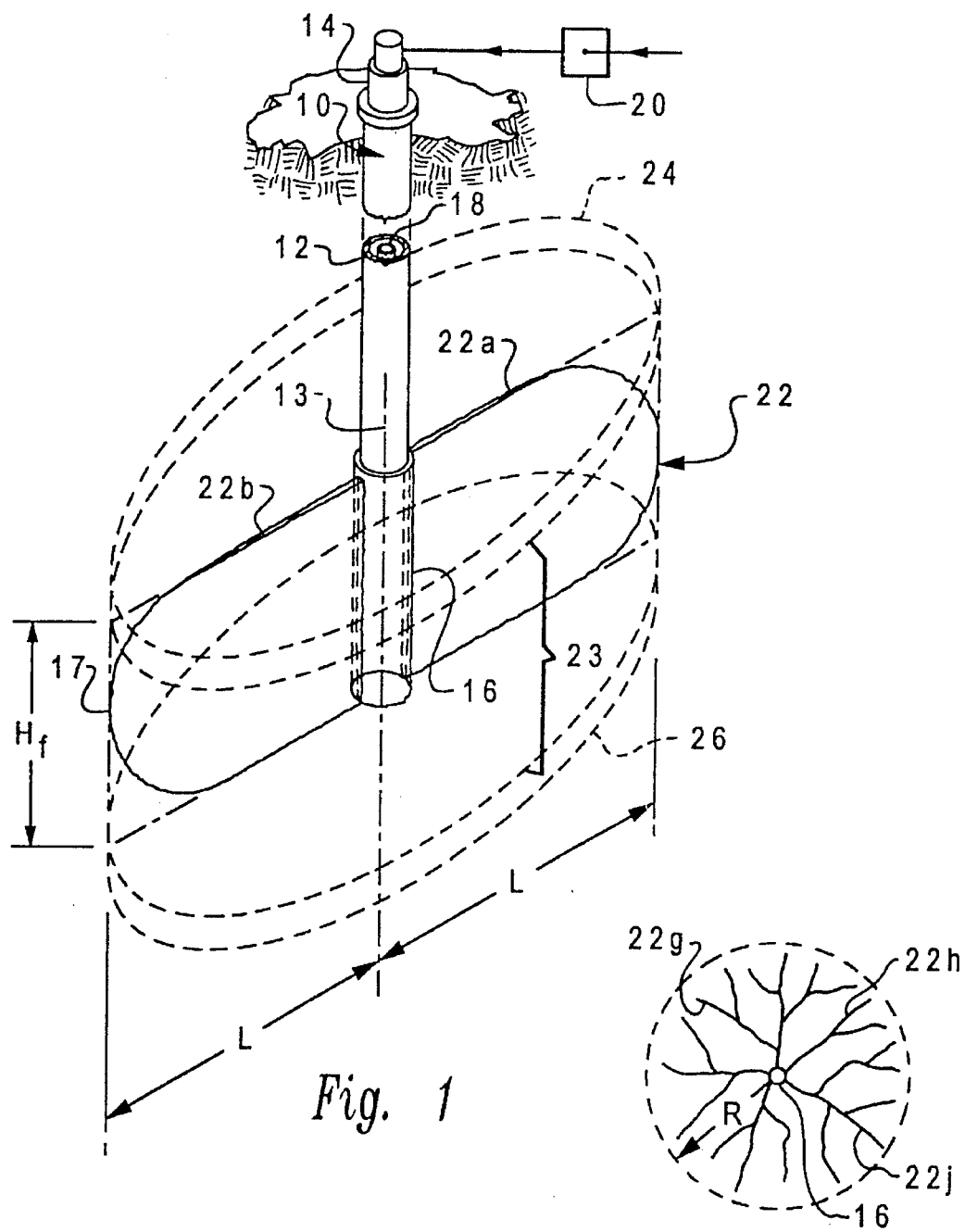
Fig. 1
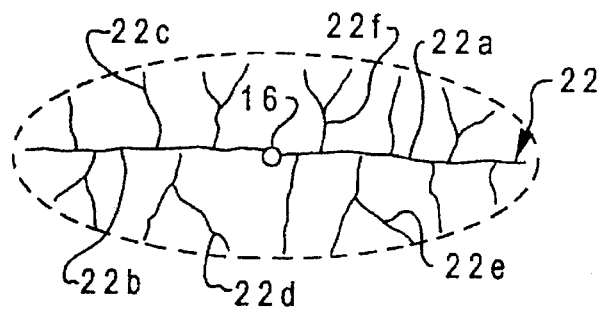
Fig. 2
Fig. 3

WASTE DISPOSAL IN SUBTERRANEAN EARTH FORMATIONS

BACKGROUND OF THE INVENTION

1. Field of the Invention

The present invention pertains to a method for selecting a subterranean earth formation zone for receiving slurried solids wastes and the like and for injecting a predetermined quantity of said wastes in the selected zone.

2. Background

Certain types of waste material, including viscous liquids and slurries of particulate solids,-may be disposed of by injecting the material into a subterranean earth formation. Typically, in disposing of solids wastes, the solids are reduced to relatively fine particulates and a slurry is prepared, usually with water as the carrier liquid, which is suitable for injection into a selected zone of an earth formation through an injection well. Moreover, when a slurry of particulate solids is injected through a hydraulic fracture in the selected zone, the liquid portion of the slurry leaks off into permeable strata, leaving the solids as a deposit which grows thicker as exposure time increases. Some portions of the fracture may become completely plugged with the solids "filter cake" while other portions of the fracture may remain open to allow the slurry to flow generally laterally outwardly from the injection well and between the layers of filter cake.

My U.S. Pat. No. 5,226,749, issued Jul. 13, 1993 and assigned to the assignee of the present invention, discloses and claims a method for disposing of slurried solids wastes in a formation zone of interest which has plural layers of material which have different permeabilities to provide alternate layers of filter cake and channels adjacent the layers of formation of relatively low permeability which permits injection of a substantial amount of material. U.S. patent application Ser. No. 08/032,951, filed Mar. 17, 1993 and also assigned to the assignee of the present invention, pertains to a waste disposal method taking into consideration that a selected zone for disposal preferably is bounded above and below by zones which have higher in situ stresses and, preferably, low permeability so that the waste material is confined to the disposal zone and hydraulic fractures do not break out vertically into zones which are in communication with fresh water sources, for example.

However, other factors should be considered when selecting subterranean earth formation zones for disposal of waste material and for carrying out the waste disposal process. A reasonably accurate estimate of the volume of material which may be injected into a selected zone should be obtained so that proper preparation for the injection process is possible, that is with respect to the volume of slurry expected to be injected, and to provide assurance that the injected volume will not result in extension of one or more fractures outside of the disposal zone. To this end certain factors should be determined such as fluid leak-off behavior, flow behavior in the presence of filter cake on the fracture faces, an estimate of how closely multiple fractures, if expected to be present, tend to be positioned and whether or not the fracture is elastically deformed and/or the fracture faces are subject to inelastic compaction. It is to these ends that the present invention has been developed.

SUMMARY OF THE INVENTION

The present invention provides an improved method of selecting a formation zone for disposal of solid wastes, an improved method of prediction of the amount of waste which may be disposed of in hydraulic fractures in subterranean earth formations and a method of injecting predetermined volumes of waste material based on such predictions.

In accordance with an important aspect of the present invention, an earth formation zone is selected and a predetermined quantity of waste material is injected thereinto based on a determination of the volume of the fracture. Fracture volume is determined based on expected fracture height, the expected fracture length or radial extent of the fracture (or fractures) from the injection well and fracture width including a determination of elastic deflection of the surrounding earth and inelastic compaction of the earth material on both sides of the fracture, i.e. the compaction of the earth material defining both fracture faces.

The present invention also contemplates a method for determining fracture volume in (a) earth formation zones wherein the principal horizontal stresses are unequal, and a substantially two-winged fracture will form which has opposed fracture wings extending in opposite directions and in a substantially vertical plane and in (b) formation zones wherein the principal horizontal stresses are substantially equal.

In accordance with another important aspect of the present invention, a method is provided for predicting the volume of a slurry which may be injected into a disposal zone in an earth formation wherein undercompacted and/or lightly cemented formation material exists which becomes substantially compacted rather than elastically deflected. The present invention contemplates that irreversible compaction results from failure of mineral grains and grain-cementing materials thus allowing the porosity of the formation to decrease. When the compaction process occurs in the vicinity of a hydraulic fracture, the fracture width will be larger than it otherwise would be for the same slurry pressure.

Those skilled in the art will recognize the above-mentioned features and superior aspects of the present invention together with other important advantages thereof upon reading the detailed description which follows in conjunction with the drawing.

BRIEF DESCRIPTION OF THE DRAWING

FIG. 1 is a perspective view in somewhat schematic form of an injection well and a hydraulically induced fracture selected in accordance with a method of the present invention;

FIG. 2 is a plan view showing a typical fracture pattern extending from an injection well in a subterranean zone having substantially equal horizontal stresses; and FIG. 3 is a view similar to FIG. 2 showing the fracture pattern where the stresses are somewhat unequal.

DESCRIPTION OF PREFERRED EMBODIMENTS

In the description which follows, like elements are marked throughout the specification and drawing with the same reference numerals, respectively. The drawing figures are not intended to be to scale.

Considerable interest continues to evolve concerning the disposal of liquid and slurried solids waste materials into certain earth formations by injection of the materials through an injection well and storage of the materials in an earth formation zone which has been hydraulically fractured. Typically, in injecting solids waste materials, the solids are mixed with water, reduced to small particles (50–200 microns) to form a slurry, and injected at high pressure into the selected zone in the earth formation. When a slurry of solids particles is injected through a hydraulically induced fracture system into a porous formation, the liquid portion of the slurry will leak off into the permeable formation material leaving the solids as a deposit of "filter cake" on the fracture faces, which filter cake grows thicker as exposure time increases.

The selection of the formation zone can include one which has alternate layers of relatively permeable and impermeable material wherein it is contemplated, in accordance with U.S. Pat. No. 5,226,749, that a greater amount of material may be deposited than would be possible with a formation zone which has substantially uniform permeability throughout the height of the fracture. It has also been recognized that the disposal zone should exhibit a pattern of horizontal stresses which have values less than zones both above and below the disposal zone to prevent or minimize unwanted extension of the fracture and resulting migration of the waste materials.

Of particular importance when injecting slurries of solids waste materials into either a permeable or relatively impermeable formation is the determination of fracture volume which will be created to accommodate the solids particles. This determination is important, in view of the costs of drilling injection wells and the preparation for injection of certain hazardous or toxic waste materials, for example, so that the desired volume of material to be disposed of may, with reasonable certainty, be injected into the selected zone. Moreover, the method of the present invention may also be used in considering the amount of proppant material to be included in a fracturing fluid when fracturing fluid production wells, such as oil or gas wells, for example.

For disposal of solids wastes into hydraulically induced fractures, it is generally considered desirable to inject relatively large volumes of solids into fractures of modest height, that is fractures having a relatively long length or lateral extent away from the injection well and which are bounded at top and bottom by formation zones of relatively greater stress than the average stress experienced in the injection zone.

Referring to FIG. 1, there is illustrated an injection well 10 having a cased portion 12, a conventional wellhead 14 and an uncased or open hole portion 16. A suitable tubing string 18 extends within the well 10 and is in communication with a slurry injection pump 20 by way of the wellhead 14 for injecting, for example, slurried solids waste materials into the open hole portion 16. As shown by way of example, a substantially vertically and laterally extending hydraulically induced fracture 22 is formed in the selected injection zone 23 and having opposed fracture wings 22a and 22b. The fracture 22 is defined by a height $H_f$ and a lateral distance L from the centerline 13 of the well 10. The injection zone 23 is preferably bounded by zones which have higher in situ stresses than the injection zone and are depicted by the elliptical dashed lines in FIG. 1 and designated by the numerals 24 and 26, respectively. It may be assumed that fracture height, $H_f$, is related to the height, H, of the injection or disposal zone 23.

$$\frac{H}{H_f} = \cos\left[\left(\frac{P-S_1}{S_2-S_1}\right)\left(\frac{p}{2}\right)\right] \quad (1)$$

where:

P is average pressure at distance L;

$S_1$ is the average opposing earth stress in the injection zone; and $S_2$ is the opposing earth stress in the top and/or bottom boundary zones.

Moreover, fracture length L is determined as being the length which makes the sum of slurry volume leaked off plus slurry volume remaining in the fracture equal to the total slurry volume injected.

The expected stresses in the disposal or injection zone 23 and the bounding zones 24 and 26 may be determined prior to injection of the waste material or other fluid by suitable means including well logging, core samples, mini-fracture injection and other techniques known to those of skill in the art. Other properties of the rock or earth material in the disposal zone 23 may also be determined such as permeability, Young's modulus and, in accordance with the present invention, the elasticity and compactability of the earth formation under a range of pressures exerted thereon. Factors such as whether or not the stresses in the formation disposal zone are uniform or a clearly defined minimum horizontal stress, for example, exists may also be determined from logging, core samples and other known techniques.

It may be assumed that the volume of a fracture crack or "wing" may be determined by considering that elastic compression of a relatively small volume of formation adjacent to the fracture faces in lateral zones on each side of the fracture occurs out to a thickness about as great as the fracture height, $H_f$. The resulting approximate fracture width, W, is given by $$W = \frac{(1-v^2)(P-S_1)H_f}{E} Z \quad (2)$$

where v is Poisson's ratio and E is Young's modulus for the formation disposal zone.

If the absolute value of $(\theta_2/\theta - 1) > 0.001$, $$Z = \frac{1}{2\theta_2}\left\{\begin{array}{l}\cos\theta\,\ln[\sin^2(\theta_2-\theta)/\sin^2(\theta_2+\theta)] \\ +\cos\theta_2\,\ln\left[\frac{(\sin\theta_2+\sin\theta)^2}{(\sin\theta_2-\sin\theta)^2}\right]\end{array}\right\} \quad (3)$$

If the absolute value of $(\theta_x/\theta-1) \leq 0.001$, $$Z = \frac{2\cos\theta_2}{\theta_2}\ln\left[\frac{1}{\cos\theta_2}\right] \quad (4)$$

$$\theta = \arccos\left(\frac{2z}{H_f}\right) \quad (5)$$

where z is the elevation from the center of the disposal zone.

$$\theta_2 = \arccos\left(\frac{H}{H_f}\right) \quad (6)$$

Accordingly, for a two-winged fracture the total crack volume, $V_f$, is:

$$V_f = 4\int_0^L\int_0^{H_f/2} W\cdot dz\cdot dL \quad (7)$$

The above estimate of fracture volume does not take into account compaction of the earth in place of or in addition to its elastic deflection or compression. This compaction, $C_{om}$, may be estimated from the above-mentioned core sample analysis, for example, and added to the calculation of fracture width. In other words, if fracture volume due to elastic deflection is determined, then to this term must be added additional fracture volume resulting from inelastic compaction. Total fracture volume for a two winged fracture then becomes:

$$V_f = 4 \left[ \int_0^L \int_0^{H_f/2} (W + 2 \cdot C_{om}) dz \cdot dL \right] \quad (8)$$

as a result of accommodating or taking into consideration compaction of the earth in addition to elastic deflection. Of course the fracture width may result entirely from compaction of the formation material with little or no elastic deflection.

The present invention contemplates that one of two limiting conditions may exist in the disposal zone wherein the stresses provide a single vertical two winged fracture, or, if there is little difference in the magnitude of the principal horizontal stresses in the formation injection or disposal zone, fractures should propagate with equal ease in any direction as indicated by the diagram of FIG. 2 wherein many fracture wings extend from the wellbore 16 such as indicated by way of example with fractures 22g, 22h and 22j. An estimate of how closely multiple fractures tend to be positioned can be gained by considering how quickly stresses or strains decay as lateral distance from a fracture increases. An estimate of the number of equivalent two-wing fractures ($N_f$) which can be accommodated within a cylindrical fractured zone, such as illustrated in FIG. 2, having a radius R is:

$$N_f = \frac{(\pi R^2 H_f)}{(4 H_f^2 L)} = \frac{\pi R}{4 H_f} \quad (9)$$

provided R>4 $H_f/\pi$

A conservative simplification of this process assumes that all fluid passes from the wellbore to the outer boundary of the fractured cylinder of radius R through a two-winged fracture wherein L equals R but that over a long period of time all fractures are extended sequentially such that all lengths advance at an essentially equal rate. Thus, the above estimate of the number of equivalent two-winged fractures which can be accommodated within a cylindrical fractured zone.

Actual conditions may be more likely those where, as a fracture extends from a wellbore and the wellbore pressure rises, the earth stresses perpendicular to the plane of the fracture increases more rapidly than the earth stresses parallel to the fracture. Accordingly, eventually an additional breakdown and propagation of secondary fractures may occur such as shown in FIG. 3 wherein secondary fracture "wings" extending from the fracture wings 22a and 22b are designated as fractures 22c, 22d, 22e and 22f, for example.

Accordingly, a quantity of waste may be disposed of in an earth formation by preselection of a zone which is, preferably, bounded both above and below by formation zones having in situ stresses which are greater than the average stress in the prescribed disposal zone. The elasticity and compaction rate of the disposal zone is then determined as well as the stress distribution from the aforementioned methods. Based on the elasticity, compaction and stress distribution, a fracture volume calculation may be carried out. If the horizontal stress ratio cannot be accurately determined and the desired injection volume can be accommodated within a single vertical two winged fracture, the process may still be carried out.

Predetermined volumes of solids waste materials may be disposed of in the form of a slurry injected into a predetermined formation zone through an injection well wherein the volume of material expected to be injected without migrating out of the disposal zone may be determined from the estimate of the number of fractures and the volume of each fracture given above followed by injection of the predetermined amount of materials. Calculations may be carried out on a digital computer based on the following assumptions or simplifications. It is assumed that the fracture is vertical and of variable height and that the height at any location in the fracture is governed by the stress distribution which consists of equal bounding zone stresses that are higher than the stresses in the disposal zone. It is assumed that the fracture is a two-winged planar fracture which extends equally in two directions from the well, or linked fractures occur in a cylindrical region. The fracture shape at any location is governed by the pressure at that location and the earth's stress distribution. The maximum width varies with position along the fracture and with time. The injected slurry exhibits power law rheology and the flow is laminar. Once laid down or positioned, the solids filter cake is not subsequently eroded by fluid motion and at any given distance away from the wellbore, the average pressure in the fracture may vary with time. The injection rate is constant and the process is operating at constant temperature, that is thermoelastic stresses are not considered.

Accordingly, taking into consideration whether or not compaction of the fracture occurs, a more accurate estimate of the volume of solids material that may be injected in a slurry is possible than heretofore. The present invention also contemplates that some formations that are undercompacted and/or lightly cemented may not exhibit any or very little elastic behavior under conditions of relatively low in situ stresses, either induced or existing at formation ambient conditions. Stresses induced in the formation as a result of slurry injection may cause irreversible compaction resulting from the failure of mineral grains and cementing material in the formation, thus allowing the porosity of the formation immediately surrounding the fracture to decrease. When such a compaction process occurs in the vicinity of a hydraulic fracture, the fracture width will be larger than it would otherwise be at the same slurry pressure. Again, tests may be run on core samples taken from the prospective disposal interval or zone to determine the amount of compaction that will occur at various stress or pressure levels.

The invention contemplates improved prediction of waste disposal processes and a waste disposal process involving hydraulic fractures which allows optimization of solids waste disposal, in particular. Although a preferred embodiment of the invention has been described hereinabove, those skilled in the art will recognize that various substitutions and modifications may be made without departing from the scope and spirit of the appended claims.

What is claimed is:

1. A method for disposing of particulate waste solids in the form of a slurry into the earth from an injection well, comprising the steps of:

locating an earth formation disposal zone bounded at least one of above or below by an earth formation zone having a higher in situ stress field;

forming a hydraulic fracture in said earth formation disposal zone;

determining the compaction of the formation in the disposal zone caused by said hydraulic fracture formed in the disposal zone at selected pressures;

determining the fracture volume based on the i n situ stress distribution, the fracture length and height and said compaction; and injecting a predetermined volume of solids laden slurry through said well into the disposal zone.

2. The method set forth in claim 1 including the step of: determining the volume of solids in said slurry injected to correspond substantially to the fracture volume.

3. The method set forth in claim 1 including the step of: measuring the compaction of the formation material in the disposal zone by applying pressure to a core sample of formation material taken from the disposal zone.

4. The method set forth in claim 1 including the step of: measuring the in situ horizontal stress distribution of the formation material in the disposal zone.

5. The method set forth in claim 1 including the step of: determining the height of the fracture based on the height of the disposal zone.

6. The method set forth in claim 5 including the step of: determining the fracture volume, $V_f$, from the relationship $$V_f = 4 \left[ \int_0^L \int_0^{H_f/2} (W + 2 \cdot C_{om}) dz \cdot dL \right]$$

wherein L is the lateral length of the fracture from said well, $H_f$ is the fracture height, $C_{om}$ is the compaction of the fracture face at the slurry injection pressure, W is the width of the fracture resulting from elastic deflection and z is the elevation from the center of the disposal zone.

7. The method set forth in claim 1 including the step of: determining the number of fractures in said disposal zone from the equation:

$$N_f = \frac{(\pi R^2 H_f)}{(4 H_f^2 L)} = \frac{\pi R}{4 H_f}$$

where $H_f$ is the fracture height, L is the length of a fracture wing, R is the radius of a cylindrical region in said disposal zone wherein the earth stresses are about equal, L=R and R>4$H_f$/π.

8. A method for predetermining the volume of particulate waste solids which may be injected into an earth formation through an injection well in the form of a slurry, comprising the steps of:

locating an earth formation disposal zone bounded at least one of above or below by an earth formation zone having a higher in situ stress field, said formation having a hydraulic fracture therein;

measuring the compaction of the formation in the disposal zone caused by said hydraulic fracture formed in the disposal zone at selected pressures;

determining the fracture volume based on the in situ stress distribution, the fracture length and height and said compaction.

9. The method set forth in claim 8 including the step of: determining the maximum number of fractures in said disposal zone from the equation:

$$N_f = \frac{(\pi R^2 H_f)}{(4 H_f^2 L)} = \frac{\pi R}{4 H_f}$$

where $H_f$ is the fracture height, L is the length of a fracture wing, R is the radius of a cylindrically fractured region in said disposal zone wherein the earth stresses are about equal, L=R and R>4$H_f$/π.

10. The method set forth in claim 8 or 9 including the step of:

determining the fracture volume, $V_f$, from the relationship $$V_f = 4 \left[ \int_0^L \int_0^{H_f/2} (W + 2 \cdot C_{om}) dz \cdot dL \right]$$

wherein L is the lateral length of the fracture from said well, $H_f$ is the fracture height, $C_{om}$ is the compaction of the formation in said disposal zone at the slurry injection pressure, W is the width of the fracture resulting from elastic deflection and z is the elevation from the center of said disposal zone.

11. A method for selecting an earth formation zone for disposal of particulate waste solids which may be injected into said earth formation through an injection well in the form of a slurry, comprising the steps of:

locating said earth formation disposal zone as one bounded at least one of above or below by an earth formation zone having a higher in situ stress field;

determining the fracture volume needed within said earth formation zone which is capable of receiving said volume of solids wherein said fracture volume is based on the in situ stress distribution, and the length and height of the fractures when formed in said zone.

12. The method set forth in claim 11 including the step of: measuring the compaction of the formation caused by a hydraulic fracture in said zone at selected pressures.

13. The method set forth in claim 11 including the step of: determining the maximum number of fractures in said zone from the equation:

$$N_f = \frac{(\pi R^2 H_f)}{(4 H_f^2 L)} = \frac{\pi R}{4 H_f}$$

where $H_f$ is the fracture height, L is the length of a fracture wing, R is the radius of a cylindrically fractured region in said zone wherein the earth stresses are about equal, L=R and R>4$H_f$/π.

14. The method set forth in claim 12 including the step of: determining the fracture volume, $V_f$, from the relationship $$V_f = 4 \left[ \int_0^L \int_0^{H_f/2} (W + 2 \cdot C_{om}) dz \cdot dL \right]$$

wherein L is the lateral length of the fracture from said well, $H_f$ is the fracture height, $C_{om}$ is the compaction of the formation in said zone at the slurry injection pressure, W is the width of the fracture resulting from elastic deflection and z is the elevation from the center of said zone.

* * * * *